Nov. 22, 1927.　　　　　　　　　　　　　　　　　　　1,650,055
H. G. TREGILLUS
FORGED GRATING AND METHOD OF MANUFACTURING SAME
Filed Oct. 15, 1926　　　5 Sheets-Sheet 1

Harold G. Tregillus
INVENTOR.

BY Harvey L. Hanson
ATTORNEY.

Nov. 22, 1927.
H. G. TREGILLUS
1,650,055
FORGED GRATING AND METHOD OF MANUFACTURING SAME
Filed Oct. 15, 1926
5 Sheets-Sheet 2
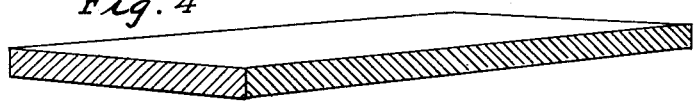
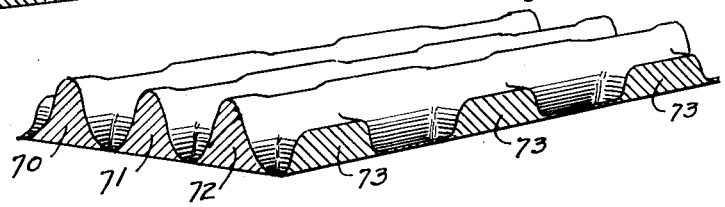
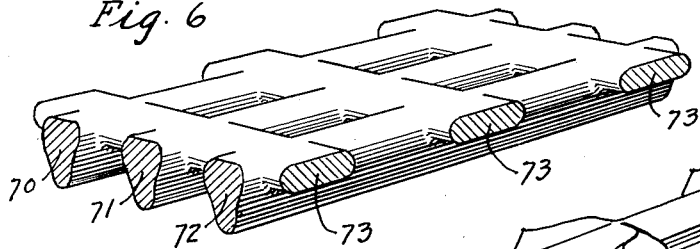
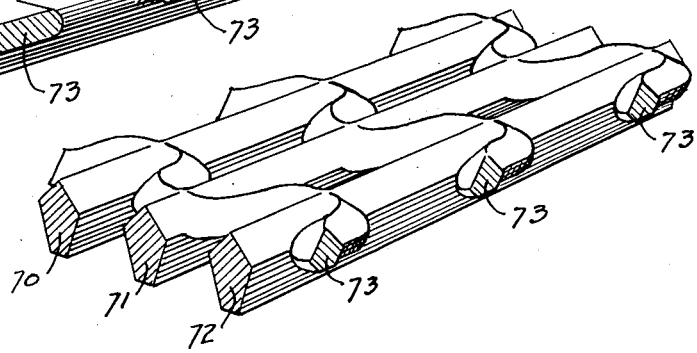
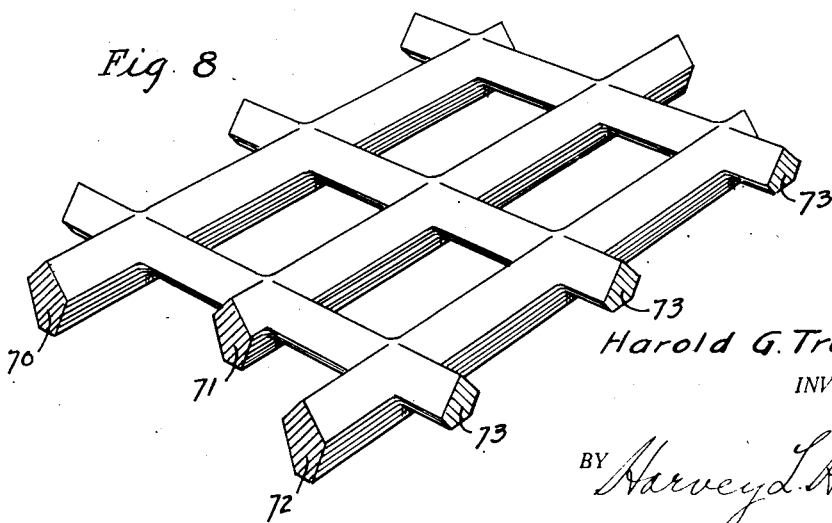
Harold G. Tregillus,
INVENTOR.
BY *Harvey L. Hanson*
ATTORNEY.

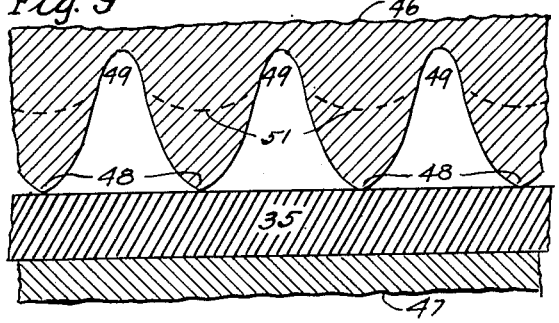
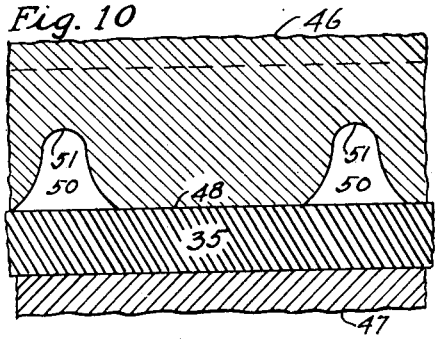
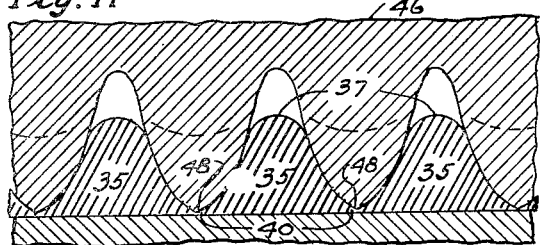
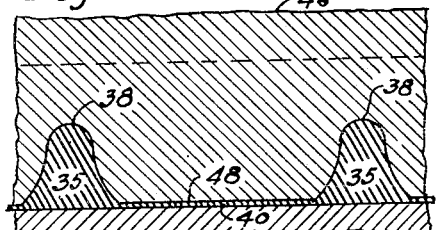
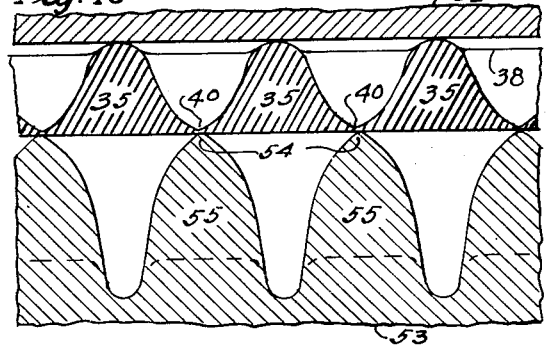
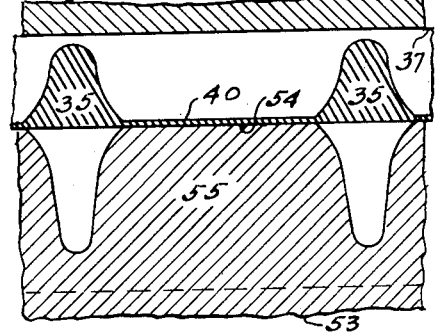
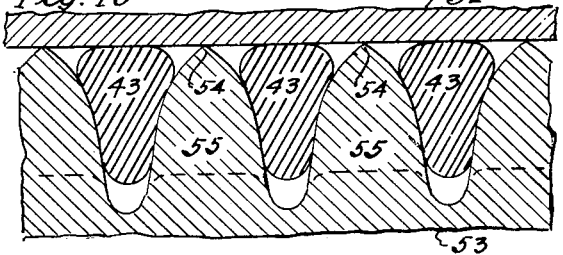
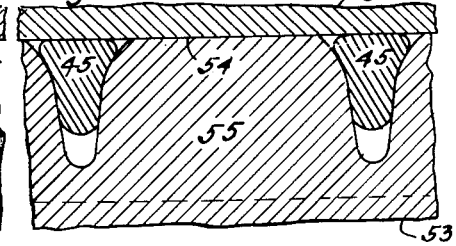
Harold G. Tregillus INVENTOR.

Nov. 22, 1927.
H. G. TREGILLUS
1,650,055
FORGED GRATING AND METHOD OF MANUFACTURING SAME
Filed Oct. 15, 1926   5 Sheets-Sheet 4
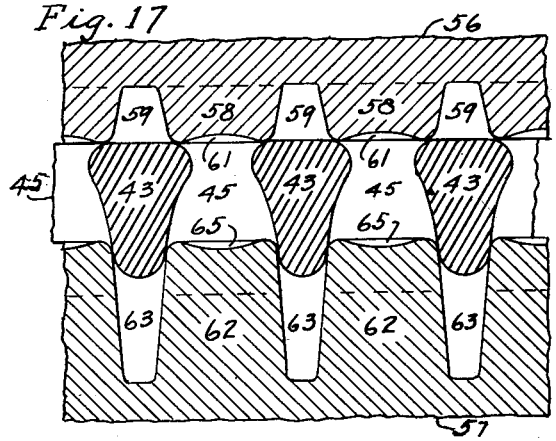
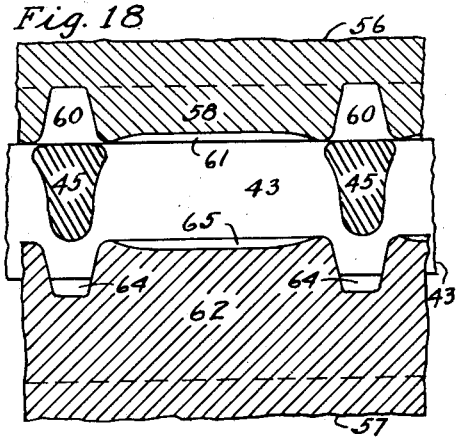
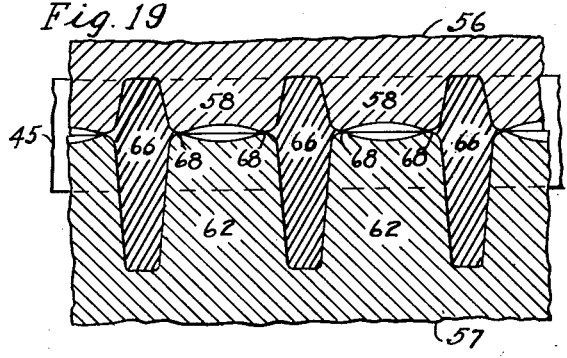
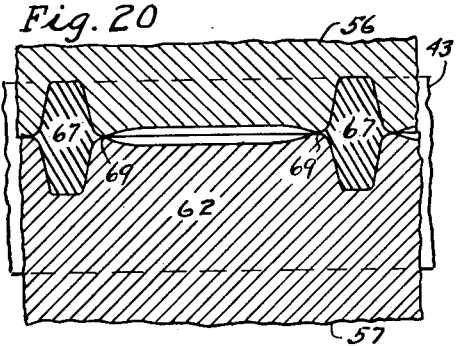
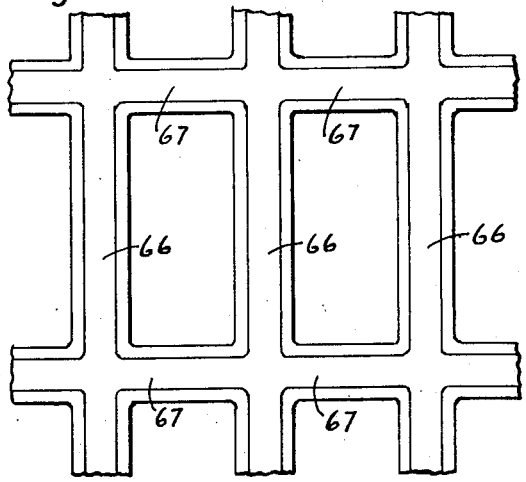
Harold G. Tregillus,
INVENTOR.
BY Harvey L. Hanson
ATTORNEY Nov. 22, 1927.　　　　　　　　　　　　　　　　1,650,055
H. G. TREGILLUS
FORGED GRATING AND METHOD OF MANUFACTURING SAME
Filed Oct. 15, 1926　　　5 Sheets-Sheet 5

Harold G. Tregillus,
INVENTOR.

BY Harvey L. Hanson
ATTORNEY.

Patented Nov. 22, 1927.

1,650,055

UNITED STATES PATENT OFFICE.

HAROLD G. TREGILLUS, OF PARK RIDGE, ILLINOIS.

FORGED GRATING AND METHODS OF MANUFACTURING SAME.

Application filed October 15, 1926. Serial No. 141,798.

My invention relates to forged gratings, and kindred products, in which openings or perforations constitute a large percentage of the total area, and in which stiffness for load-carrying qualities and general strength are required, and the method of manufacturing said forged gratings.

The purpose of my invention is to provide a unit of grating, or related product, of convenient size, forged from a single piece of metal without resorting to the process of building up such unit by combining small parts or members.

The following disclosure covers steel gratings, but it is understood that bronze, or other metal having the required characteristics of strength, rigidity, durability, proper working qualities, and the like, may be used.
The crude material, preferably in a heated state, depending upon the kind of metal used and its ductility and malleability, is treated by mechanical process. The number of operations varies. For certain products one operation may suffice, while for others the metal may be gradually formed by means of a series of operations until the finished product is obtained.

In general the operations consist of forging under hammer, press, or roller, or the combination of any or all these methods.

The structure of my invention may be in any one of a great variety of forms, each best suited to its particular use. It may be forged by hand by one skilled in the art of blacksmithing, but the cost of such process would be prohibitive, therefore, to be useful, my structure must lend itself to manufacture by mechanical process, which it does. The crude material, from which the units are to be manufactured, may be in the form of plates, bars, billets, slabs or blooms, having a transverse cross-section which is generally rectangular and suitable for the finished product.

It is to be noted that in any of the steps of the process of my invention it is essential that the material be worked in a sub-molten state, so that its mass, while not liquid, may yet be caused to flow into the required form under blows or pressure. This characteristic is understood to define clearly one of the differences between my invention and structures of the prior art which are cast in liquid state, or in which the material in solid state, is formed by cutting, punching, bending, twisting, and the like.

The structure of my invention has all the advantages of a built-up grating made of crossed, latticed, or zig-zagged light members, but being in fact a single piece of metal, without fastening means, such as welding, riveting, and the like, it has also the added advantages of solidity, strength and durability.

Further advantages of my invention will be readily seen when all the uses to which gratings may be put are considered. The structure of my invention may be used for walkways of all descriptions, and is particularly suited for exposure to sleet and ice; the net horizontal surface area being so small that the ice will crack and fall off as the pedestrian walks over it, thus eliminating the danger of slipping. It may be used for floors, stair treads, window-guards, railings, fences, bank grilles, ventilators, radiator grilles, balustrades for balconies, bridges, and so forth, fire-escapes, sewer and other manhole covers, gates, screens, sides for coke cars, corn-cribs, self-centering and other reinforcement for concrete and kindred substances, and for a great many other purposes.

In my grating the longitudinal and transverse portions may be of any desired shape as to cross-section. They may be straight or curved, and may have any desired angle between each other. Also, the apertures may be of any desired shape and size, and either the longitudinal or lateral portions may be continuous or broken, as for instance, in the case where apertures are of hexagonal shape.

The invention will be explained and more clearly understood when read in conjunction with the accompanying drawings, which illustrate embodiments to which the invention is susceptible, it being obvious that changes and modifications may be made without departing from the spirit of the invention, as expressed in the appended claims forming a part hereof.

In the drawings:

Figure 4 is a perspective view of a metallic plate used in forming the structures of my invention shown in Figures 5, 6, 7 and 8, which plate is considerably narrower than the finished product of Figure 8.

Figures 5, 6, 7 and 8 are perspective views of the plate of Figure 4 after it has been subjected to succeeding operations in my process.

Figure 1:
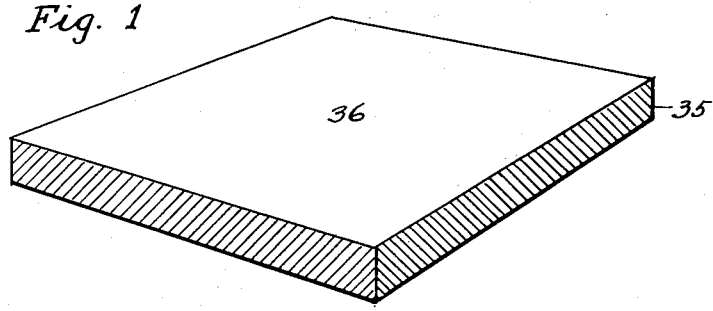
Figure 1 is a perspective view of a metallic plate from which the structure of my invention is to be formed.

Figures 9 to 20, both inclusive, illustrate generally, in sequence, the various operations in my process for changing the form of the metal from that of a flat plate, as in Figure 1, to a finished grating, as in Figure 21.

Figure 21 illustrates a portion of a specific form of the finished grating resulting from the operation of my process, as shown in Figures 9 to 20, both inclusive.

Figure 22:
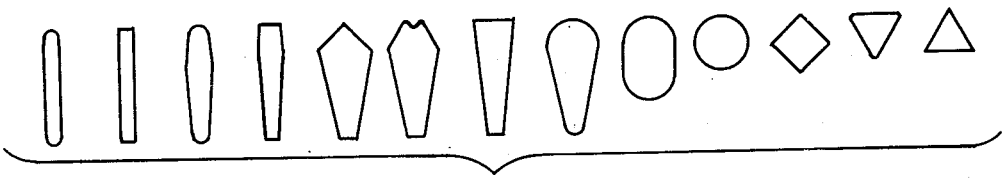

Figure 22 illustrates the contour of the cross-section of various forms of the longitudinal and transverse portions of the finished product of my invention.

Figures 23 to 28, both inclusive, illustrate in plan view various forms of portions of the structures of my invention.

Figure 29:
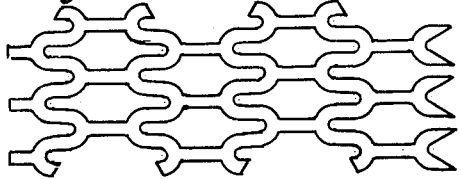
Figure 30:
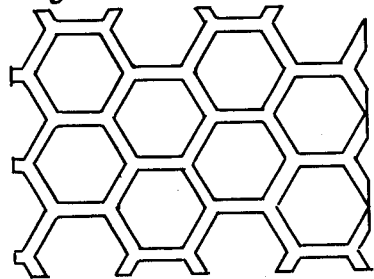

Figure 29 shows in plan view a modification of my grating which may form an intermediate step in producing the form shown in Figure 30.

Figure 31:
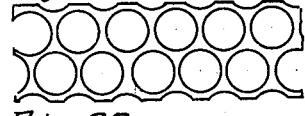
Figure 32:

Figure 30 shows a plan view of my grating, which may be produced from the form shown in Figure 29, or may be produced by the process illustrated in Figures 9 to 20, both inclusive, and, Figures 31 and 32 show other modifications of my invention, in plan view.

The procedure in the manufacture of my grating is as follows:

A plate of metal, 35, preferably steel, is heated to the proper temperature for working. It is then indented on its upper surface 36 until it assumes the form of the metal 35, shown in Figure 2, the upper surface 36 of which has now become a series of longitudinal and transverse ridges, the longitudinal ridges being shown at 37, and the transverse ridges at 38. The depressions or indentations surrounded by the ridges are shown at 39, in Figure 2. The thickness of the metal at the deepest portion of the depressions is reduced to a minimum, or thin web, as at 40.

Figure 2:
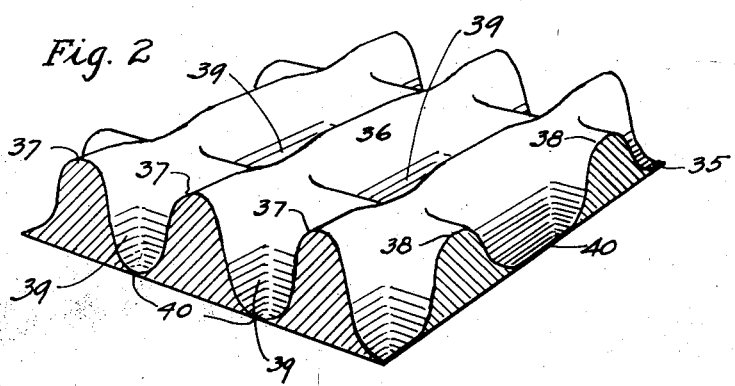
Figure 2 is a perspective view of the material of Figure 1 after it has been subjected to the first operation in the process of forming.

In producing the indentations 39 in the plate 35, part of the material becomes displaced and distorted, and being forced up and forming ridges 37 and 38, the extreme thickness from crowns of ridges to the underside of the plate 35, in Figure 2, is considerably greater than the plate 35 of Figure 1. It has been found in the actual practice of the invention that the height of the longitudinal ridges becomes less at the points where they meet the transverse ridges than at intermediate places. The reason is obvious when one considers the movement of the particles in forming the ridges. Where there is a transverse ridge to be formed, less metal is forced into the longitudinal ridge than elsewhere, hence, the lesser height at the transverse ridge.

Figure 3:
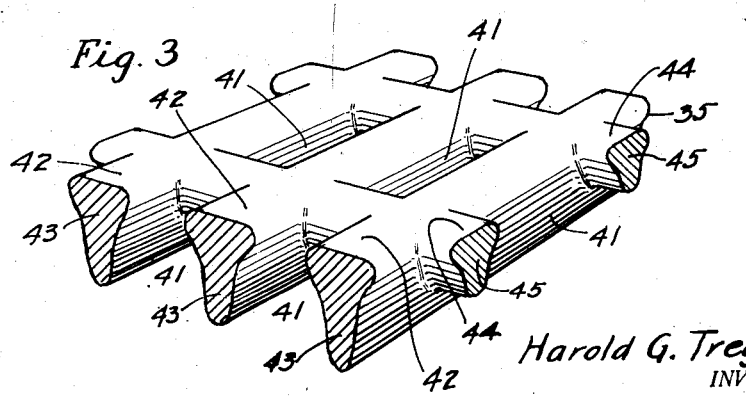
Figure 3 is a perspective view of the metal after it has been subjected to the second operation.

Next, the metal 35 of Figure 2 is pierced from the under side at its thinnest portions 40 so that the plate 35 now assumes the form shown in Figure 3. The depressions 39 of Figure 2 have become the apertures 41 of Figure 3, the ridges 37 of Figure 2 have become the upper surfaces 42 of Figure 3 of the longitudinal portions 43, and the ridges 38 of Figure 2 have become the upper surfaces 44 of the transverse portions 45 of Figure 3. Thus the structure of Figure 3 is a grating in the rough, as described. The form of the longitudinal transverse portions may be somewhat irregular, and not usable as a finished product for all purposes, but the proportion of the open area is considerable in relation to the total area of the piece. The form of the longitudinal and transverse portions may be changed, as required. A method for finishing this product is described below.

Owing to the mechanical means employed in forming this grating, in Figure 2 the material is flat on its under surface, while it becomes flat on its upper surface in Figure 3. Also, in Figure 2 the transverse portions 38 are below the longitudinal portions 37, while in Figure 3 the transverse portions 45 are flush on top with the longitudinal portions 43, and at the same time the bottoms of the longitudinal portions 43 are below the bottoms of the transverse portions 45. These last-mentioned conditions are peculiar to the method and devices to be described hereinafter, and are not essential to the invention. The longitudinal and transverse portions may be flush on top and bottom, and modifications later described show variations in these conditions.

It will be understood that the grating portion shown in Figures 2 and 3 is merely for the purpose of illustration, and that the grating may be of any desired size.

The method or process which is followed in order to secure the results hereinbefore described is shown in Figures 9 to 20, both inclusive. In each of these figures small portions of an upper and a lower die are shown in cross section. Figures 9, 11, 13, 15, 17 and 19 are sections transverse to the longitudinal portions of the grating, while in the remaining figures the sections are longitudinal thereof. It is understood that the amount of each die portion shown is only sufficient to give its contour, that it may extend in any direction to the required size, and that it is applied to a press of any suitable construction in any desired manner. It has not been considered necessary to illustrate any of the mechanism of the press, the only requirement being means for forcing the upper and lower dies toward each other.

For simplicity of description dies for use with a press have been illustrated. Such dies would naturally have the mean surface in a true plane. It is generally preferable, however, to construct the dies in the form of rolls so that the surfaces thereof become cylindrical instead of plane. The cross sections shown in Figures 9, 11, 13, 15, 17 and 19 would have no different appearance for rolls than for plane dies, but the curve would appear in Figures 10, 12, 14, 16, 18 and 20.

When upper and lower rolls are used in place of upper and lower dies, one of the advantages of my invention is that during the preliminary operations, one of the two rolls is smooth, thus eliminating the necessity of registration between the upper and lower rolls. It is understood, of course, that each roll rotates in a permanent location, and the metal between them travels in a longitudinal direction in the well known manner.

In Figure 9, 46 is a partial section through the upper die, 35 is the heated plate to be worked, 47 is the lower die with a smooth upper surface, all shown in the transverse section. The die 46 comprises a number of teeth having substantially pointed ends 48 in cross section. Between the teeth are recesses 49. The longitudinal section of each of these parts is shown in the adjacent Figure 10. The portions 48 which appear as pointed, in Figure 9, are in reality elongated edges, as illustrated at 48 in Figure 10. Between these edges are recesses 50, the upper boundary of which is shown at 51 in Figure 10, and by the dotted lines 51 in Figure 9. It is preferable that these recesses be curved, as shown, in order to merge gradually into the recesses 49.

By exerting downward pressure on the upper die 46, as in Figure 11, the edges of the portions 48 are forced into the metal 35, causing ridges 37, in Figure 11, and 38 in Figure 12, corresponding with the tops of the longitudinal transverse ridges 37 and 38 in Figure 2, to be formed in the plate 35. Upon reaching the end of its downward stroke the die 46 has penetrated and almost pierced the plate 35, producing extreme thinness at 40. Owing to the displacement of metal the depth of the plate 35 from the top of the ridge 37 to its under side is now greater than the original thickness of the plate.

The material is next placed between other dies, as illustrated in Figure 13, in which 52 is the upper die, 35 is the plate, as previously formed, and 53 is the lower die.

By exerting upward pressure on the lower die 53, sharp edges 54 of the projecting portion 55 of the die 53 are forced into and through the thin portions 40 of the plate 35, and upon reaching the end of the stroke, as illustrated in Figure 15, they have not only pierced the material, but also have distorted the ridges until they have become the longitudinal portions 43, as also shown in Figure 3. The corresponding changes in the transverse ridges and portions are illustrated in Figures 14 and 16. Thus by means of two operations, and the use of dies 46, 47, 52 and 53, the form of the plate 35 of Figure 1 has been changed to the form shown in Figure 3, and, as a result, a rough grating has been produced.

In order to form the rough grating into the finished product, it may be necessary to resort to a third operation in which the contour of both the upper and the lower dies conforms to the finished grating. Such dies must, of course, register accurately one with the other. This operation is illustrated generally in the transverse sections, Figures 17 and 19, and the longitudinal sections, Figures 18 and 20. In the event that a fin is produced at the meeting surfaces of the upper and lower dies, this fin may be removed by sandblasting, or other suitable means.

In Figures 17, 56 represents in section a portion of the upper die, and 57 represents in section a portion of the lower die. The grating structure, with the longitudinal and transverse portions 43 and 45, respectively, is placed between the upper and lower dies 56 and 57, respectively. The upper die is provided with the projections 58 and the recesses 59. The projections 58 are non-continuous, but are separated by other transverse recesses 60, shown in Figure 18, so that the lower face of the die 56 is traversed in two directions by grooves. The face of each projection 58 may be slightly hollowed, as indicated at 61, in order to reduce the area of the contact which it makes with the lower die, and thus more readily dispose of any fin which may occur in squeezing the portions 43 and 45.

The lower die may be similar or identical to the upper die. In Figures 17 and 18 it is shown having deeper projections 62 and deeper recesses 63, while the recesses 64 are approximately of the same depth as the recesses 59 and 60 in the upper die 56. The slightly hollowed surfaces 65 are also provided in the faces of the projections 62.

Downward pressure exerted upon the upper die 56 causes it to approach the lower die 57 and the metal 43, 45 is squeezed into the shape shown at 66, 67 in Figures 19 and 20. Coincident with this squeezing a small amount of metal may escape from the sides of the recesses 59, 60, 63 and 64 at 68 and 69. Owing to the reduced area of contact between the upper die 56 and the lower die 57, at 68 and 69, such material as is forced between them at these locations will be extremely thin, and will readily break off. The intention is, of course, to proportion the dies so that as much metal as possible remains in the recesses 59, 60, 63 and 64, and have as little escape as possible to form fins, as described above.

The metal 66, 67, when removed from between the dies 56 and 57, is shown in Figure 21. This figure represents grating which is suitable for commercial use. The longitudinal portions 66, being of suitable depth, carry the load upon the grating over a considerable span, while the transverse portions 67, being of lesser depth, function mainly as spacers for the longitudinal portions, and also serve to distribute the load occurring on any one longitudinal portion to the adjacent longitudinal portions. In commercial practice such a grating is manufactured in strips several inches to a few feet in width, and of whatever length may result from the size of the billets or plates used as crude material. The required sizes are then cut from the strips by shearing, sawing, oxy-acetylene burning, or other suitable means. Ordinarily this grating is supported by a structural steel framework, which is part of the building structure, rather than part of the grating, and which has not been shown.

Figures 4 to 8, both inclusive, illustrate a modification in the form of grating produced. Figure 4 represents a perspective view of the heated plate. Figure 5 illustrates the change in the plate of Figure 4 brought about by the first operation. It now has a plurality of longitudinal portions 70, 71 and 72, and a plurality of transverse portions 73. Figure 6 is a perspective view of the change brought about by the second operation in the plate of Figure 5. The preceding operations are very similar to the operations previously described with reference to Figures 2 and 3.

Figure 7 is a perspective view of the structure of Figure 6 after it has been formed by pressing between upper and lower special dies accurately registered so as to produce the contour shown. It is understood that a great variety of contours in special dies may be used, therefore, further description of special dies is not considered to be necessary.

In Figure 7 it is to be noted that while the longitudinal portions 70, 71 and 72 are straight, the transverse portions 73 are curved in the form of an S. Now if these transverse portions 73 be straightened, the longitudinal portions 70, 71 and 72 will, of necessity, move further from each other. To accomplish this it will be necessary that the intermediate longitudinal portion 71 of Figure 7 travel longitudinally, as the remaining longitudinal portions 70 and 72 travel laterally away from each other and from the intermediate portion 71. The result of straightening the transverse portions, and the consequent change in the relative positions of the longitudinal portions is clearly illustrated in Figure 8. The advantage of this method of producing grating is that it permits the manufacture of wide portions of grating from a comparatively narrow plate. It also eliminates the necessity of having extremely wide dies or rolls to produce the structure of Figure 7.

The devices required in the first two operations, that is, to produce the structure of Figures 5 and 6 respectively, are analogous to the devices illustrated in Figures 9 to 16, both inclusive. The similarity of form between Figures 3 and 6 will be noted, and it is considered unnecessary to repeat a description of the dies, and their action. From the structure of Figure 6 the production of the structure of Figure 7 is brought about by pressure between registering dies in much the same manner as illustrated in Figures 17 to 21, both inclusive, the only difference being that to produce the structure of Figure 7 the face of each die must be constructed so as to match the upper and lower surfaces of the structure of Figure 7.

To change the structure of Figure 7 to that of Figure 8 it is necessary to use expanding means of the prior art, or of other suitable design. The outer longitudinal edges of the structure of Figure 7 must be clamped to moving parts of the expanding device in such a manner that they will pull transversely to the material, thus increasing the width, and at the same time cause the transverse portions 73 to become straight, and alternate longitudinal portions, such as 71, to travel in a longitudinal direction. Such devices and operations are well known in the art of expanding metal, and need not be described here.

The cross section of the longitudinal and transverse portions of the gratings may be given any shape desired and consistent with the method of production, including square, rectangular, round, oval, rhombic, hexagonal, pear-shaped, and trapezoidal shapes. Some of these shapes and others are illustrated in Figure 22. Similarly, the apertures through the grating may be of any geometric design, including those just mentioned.

Figure 23:
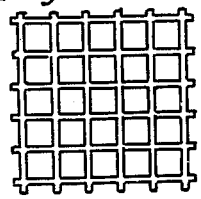
Figure 24:
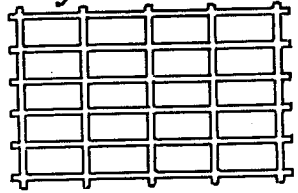
Figure 25:
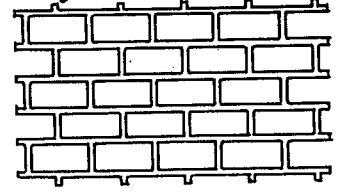

Figures 23, 24 and 25 illustrate roughly in plan view gratings having square and rectangular openings, and which will generally be produced by the method illustrated in Figures 9 to 20, both inclusive.

Figure 26:
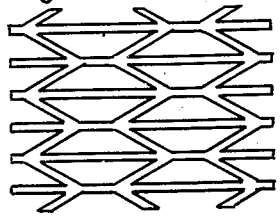
Figure 27:
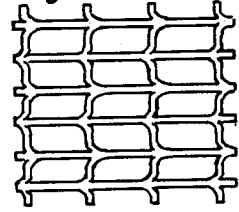

The structures of Figures 26 and 27 may also be produced by the same method, or they may be produced by pressing and expanding, as is the case in the structure of Figure 8. In Figure 26 such expanding necessitates a stretching of the material of the transverse oblique portions.

Figure 28:
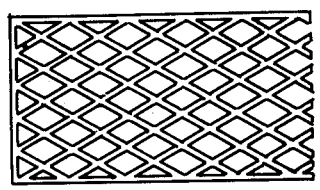

The structure of Figure 28 has apertures which are not rectangular, but which may be formed in the same manner as the rectangular openings in the structure of Figure 21. Figure 28 also shows how small units suitable for stair treads may have a border or edged portion formed thereon. The border or edged portion may have greater depth than interior portions, and all the interior portions may be of equal depth.

Figure 29 shows a form of grating which may be produced by pressing, and which afterwards may be expanded into the form shown in Figure 30. However, the form of Figure 30 may be produced directly by pressing without expanding, unless it is desired to produce gratings having greater widths than the crude material.

Figure 31 shows a form which may be pressed, or expanded from the form of Figure 32. The form of Figure 32 may also be expanded in a diametrically opposite direction from the form of Figure 31.

In Figures 23 to 32, both inclusive, it is understood that the portions running in one direction may have a different depth from those running transversely thereof, or the depths may be equal. In the forms illustrated in Figures 23 to 27, both inclusive, ordinarily the portions more closely spaced would be the longitudinal portions and have greater depth than the more widely spaced transverse or oblique portions. In the forms shown in Figures 28, 30 and 31 all portions would generally have the same depth.

From the foregoing it will be seen that I produce a forging in reticulated form without the necessity of joining the portions of the structure by welding or other means, and whether the forging be done by hand or mechanical means, the result is a new and useful improvement in the art of construction and manufacture of gratings.

In order to make more clear the appended claims, as well as the foregoing description, I desire to define the word "piercing" as used therein. The term piercing is intended to describe the action which occurs when a substantially sharp point or edge is forced into and through the metal, as distinct from shearing and punching, as generally understood. In piercing, some of the metal is forced in a direction transverse to the path of the piercing means. In shearing and punching the metal is forced in a direction parallel to the path of the tool.

Having thus described my invention, what I desire to claim and secure by Letters Patent is:

1. A structural steel grating having intersecting longitudinal and transverse ribs and intermediate openings, formed from a substantially flat metal unit by indenting one surface thereof to outline said ribs, and piercing the metal at said indentations to form said openings by forcing the metal laterally toward the ribs, said ribs being thus reinforced.

2. A forged grating, having intersecting longitudinal and transverse ribs and intermediate openings, formed from a substantially flat metal unit by forcing portions of the metal laterally to form said openings and augment said ribs, the resultant grating having greater thickness than said metal unit.

3. An expanded grating having intersecting longitudinal and transverse ribs and intermediate openings, formed from a substantially flat metal unit by indenting one surface thereof to outline said ribs, piercing the metal at said indentations to form said openings by forcing metal laterally toward the ribs, said ribs being thus reinforced, and the unit being stretched laterally thus increasing the size of said openings.

4. The method of forming a metal grating which consists in pressing a unitary metal blank to form indentations on one surface, then piercing at said indentations from the opposite surface of said blank, to form apertures and force the metal laterally of said apertures, whereby the thickness of the finished grating is greater than that of said blank.

5. The method of forming a metal grating which consists in pressing a unitary metal blank to form indentations on one surface, then piercing at said indentations from the opposite surface of said blank to force the metal laterally and form apertures in said blank, and finally squeezing and compressing the metal between said apertures to form the final cross-section having greater thickness than said metal blank.

6. The method of forming a metal grating by first indenting a metal blank to outline the ribs on one surface, then piercing at said indentations to form apertures, thus forcing the metal laterally toward and reinforcing said ribs, then squeezing the metal of the ribs to desired cross-section, and finally expanding by tensioning the grating from opposite edges to make the required area.

In witness whereof, I hereunto subscribe my name this 11th day of October, A. D. 1926.

HAROLD G. TREGILLUS.